July 23, 1974 ATSUTAKA OKA 3,825,446
LEAD-ZINC PRIMARY BATTERY
Filed Nov. 10, 1972 4 Sheets-Sheet 3
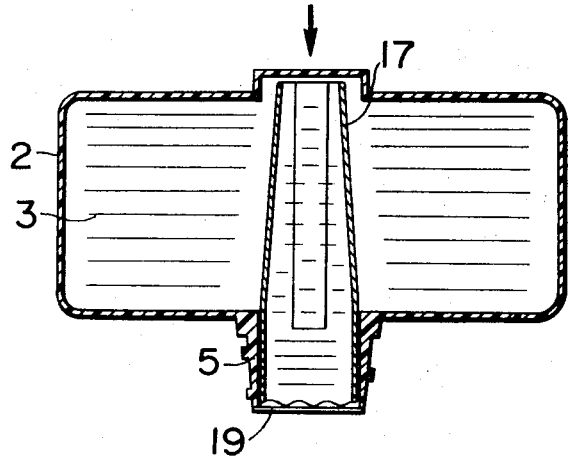
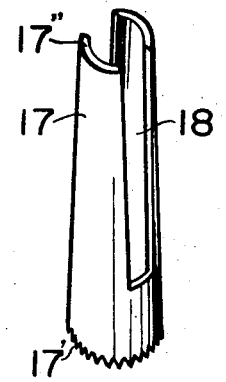
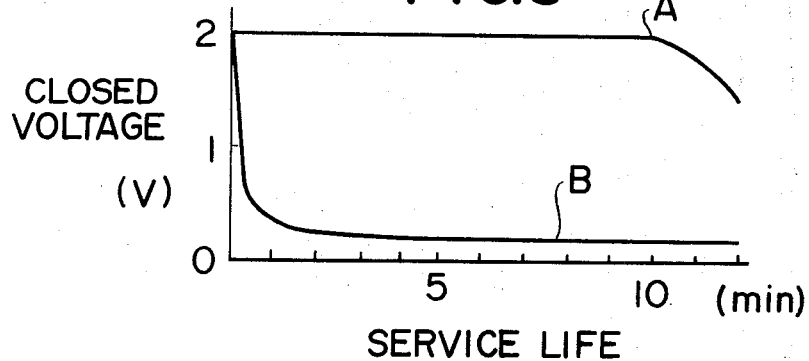

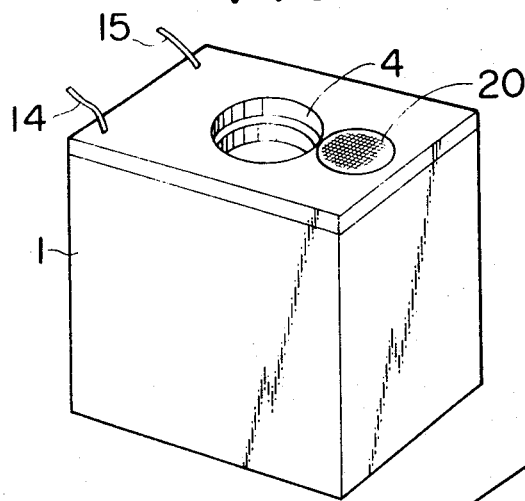
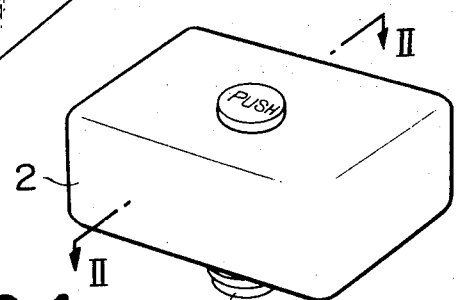
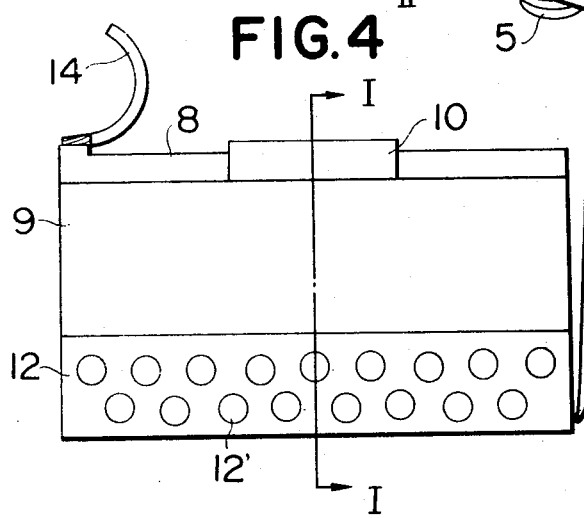
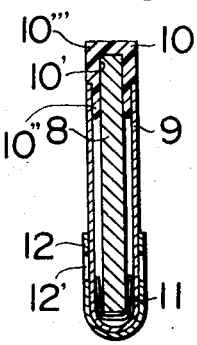

United States Patent Office 3,825,446
Patented July 23, 1974

3,825,446
LEAD-ZINC PRIMARY BATTERY
Atsutaka Oka, Takatsuki, Japan, assignor to Yuasa
Battery Company Limited, Takatsuki, Japan
Filed Nov. 10, 1972, Ser. No. 305,540
Int. Cl. H01m 17/00
U.S. Cl. 136—114                              6 Claims

ABSTRACT OF THE DISCLOSURE

A primary battery of lead-zinc type comprising a battery main body and a container jointed together, said battery main body consisting of a plurality of cells holding a lead positive plate and zinc negative plate supported by an electrode holder and a heating material, said container holding sulfuric acid and push rod therein and having a spout sealed with a membrane. When the container is pressed with hand from its outside, the lower edge of the push rod breaks the sealed membrane, allowing sulfuric acid to pour into the battery main body to activate the battery. The primary battery of lead-zinc type according to this invention has better performance at low temperatures and is simple to make and low in price.

---

The present invention relates to a primary battery, and more particularly, to a novel primary battery of the lead dioxide-zinc type.

The known primary battery of the lead dioxide-zinc type is composed of a lead dioxide positive electrode, a zinc negative electrode, a separator inserted between the two electrodes, and an electrolyte of sulfuric acid. This type of battery suffers from the defect that the separator used causes an increase in the internal resistance of battery, making the battery unsuitable for a large current, assembly of battery takes a long time, and the production cost is high. This type of battery has another disadvantage that the chemical reaction between zinc and sulfuric acid is retarded at low temperatures near $-20°$ C. and the surface of the zinc negative electrode is covered by hydrogen gas, with a rapid decrease in discharge voltage which does not permit normal discharging. The present invention will overcome all of these defects.

The first object of the invention is to provide a primary battery of the lead dioxide-zinc type having better performance at low temperatures.

The second object of the invention is to provide a primary battery of the lead dioxide-zinc type which is easy to make and low in price.

These objects of the invention will be better understood from the following description and accompanying drawing.

In the drawing:

FIG. 2 is a perspective view of the battery main body which is a moiety of a primary battery according to the invention;

FIG. 3 is a perspective view of a container holding sulfuric acid, which is another moiety of a primary battery;

FIG. 4 is a front view of the negative and positive plates arranged within the main body of a primary battery;

FIG. 5 is a longitudinal cross sectional view of the negative and positive plates taken across the line I—I of FIG. 4;

FIG. 6 is a longitudinal cross sectional view of the container taken across the line II—II of FIG. 3;

FIG. 7 is a perspective view of the push rod furnished to the container;

FIG. 8 is a graph showing the discharge diagrams of a battery according to the invention and conventional battery at $-20°$ C.;

Figure 1:
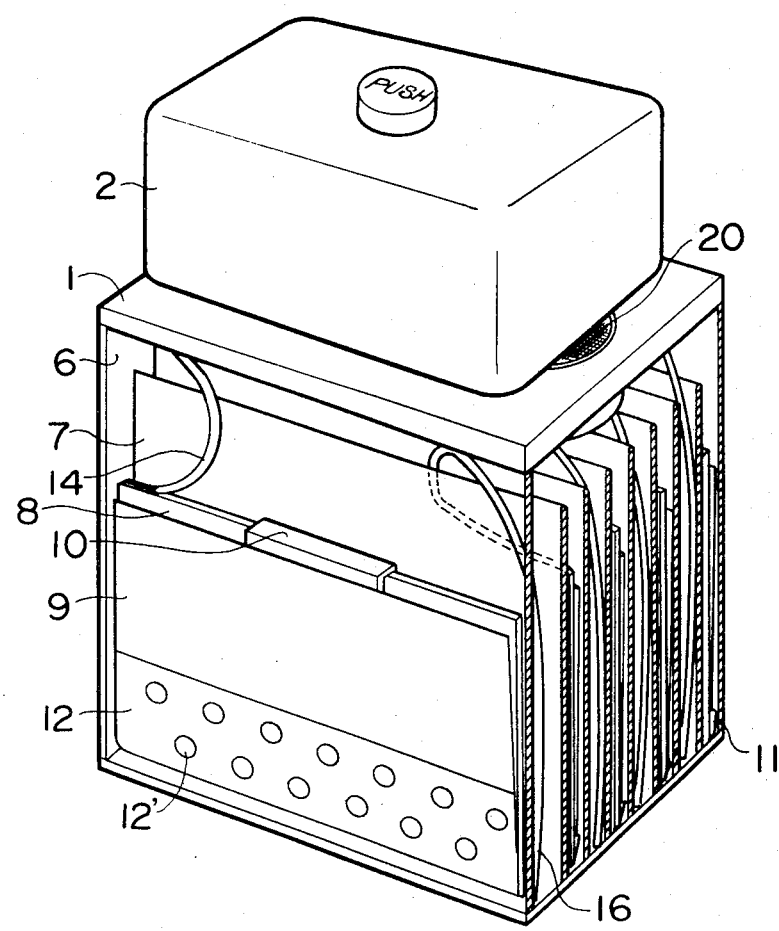
FIG. 1 is a perspective view of a primary battery according to the invention.

Referring now to FIG. 1 and FIG. 2 of the drawing, the main body of the battery is indicated by reference number 1 and the container holding sulfuric acid as an electrolyte is indicated by reference number 2. They are jointed together by screwing the spout 5 of the container 2 into the opening 4 provided on the top of the battery main body. The plastics container of the battery main body 1 is indicated by reference number 6. The partition 7 divides the inside to form a plurality of cells. FIG. 1 shows eight cells. Each cell holds the positive plate 8 and negative plate 9, the former being the same as the $PbO_2$ plate used in an ordinary lead dioxide storage battery, and the latter being a zinc plate. The lead dioxide plate of the positive plate 8 is supported by the center groove 10' of the plate holder 10 made of plastics such as PVC resin or ABS resin, having some elasticity. It is preferable that the center groove 10' be so molded that its width is a little smaller than the thickness of lead dioxide plate of the positive plate 8; thus, the positive plate 8 is securely held by the center groove 10' and does not come off easily.

In the similar manner, the shaved section 10" is provided on both sides of the plate holder 10 to support the zinc plate of U-shaped negative plate 9. The insulating bottom paper 11 made of kraft paper is inserted between the negative plate 9 and the bottom of the positive plate 8.

The heating material 12 is made up of metallic magnesium, metallic calcium, or oxide or hydroxide of alkali or alkali earth. It may be in any shape of powder, pellet, plate, and so on, but preferably it is a U-shaped plate, with many holes 12', surrounding the bottom and lower sides of the negative plate 9. Unlike a powdery heating material, the heating plate is immovable and allows uniform heat generation due to uniform distribution of the heating material. The holes 12' are effective for allowing sulfuric acid 3 as an electrolyte to disperse in the battery. It is the important feature of the invention to arrange the heating material 12 in the battery to improve the characteristics at low temperatures.

Sulfuric acid 3, which constitutes an electrolyte when poured into the battery, reacts with the heating material 12 such as metallic magnesium to generate heat vigorously together with hydrogen gas. This helps the dispersion of hydrogen gas covering the surface of the negative plate at the beginning, and at the same time, increases the temperature of the electrolyte within a short time period, allowing normal discharging. The discharge diagram comparing battery A of the invention and battery B of conventional type is shown in FIG. 8 in which the closed voltage (V) is plotted on the vertical axis and the service life (minute) is plotted on the horizontal axis. Values were obtained when discharging was performed at a current density of 75 ma./cm.$^2$ at $-20°$ C. using sulfuric acid having a specific gravity of 1.28. It will be understood from these curves that a primary battery of the invention is excellent in the discharge characteristics.

Units consisting of positive plate 8, negative plate 9, electrode holder 10, kraft paper 11, and heating material 12 are put in each cell. In order to fix these units in the battery container 6, both sides of electrode holder 10 are jointed with an adhesive agent to the inner wall of each cell of the battery container 6. This greatly improves resistance to vibration and makes the assembly process simpler than any other fixing methods. The respective lead wires of positive plate 8 and negative plate 9 are indicated by reference numbers 14 and 15, and the cell connector is indicated by reference number 16. One end of the terminal lead wire and cell connector is advantageously connected by welding to the lower part of the negative plate, because a zinc negative plate tends to dissolve from its top with discharging. Therefore, if connection is made at the top of negative plate 9, the terminal lead wire and cell connector will be separated from the negative plate, and the battery will become unusable. To avoid this, negative plates thicker than necessary have been in use at the sacrifice of efficiency. In this invention the negative plate 9 can be made thinner with an improved efficiency, because the terminal lead wire and cell connector are connected at the bottom of negative plate 9 and are prevented from coming off.

The push rod 17 shown in FIG. 6 is placed at about the center of the container 2 holding sulfuric acid 3 as an electrolyte and is held by the inner wall of the spout 5. This push rod 17 is a slightly tapered cylinder with a pair of notches 18 and toothed lower edge 17'. While the primary battery is not in use, the push rod 17 stays in the container 2, when the primary battery is to be used, the container 2 is pressed at its projected part. The toothed lower edge 17' will break the membrane 19", allowing sulfuric acid 3 in the container 2 to pour into the battery main body 1 to activate the battery. Thus, the battery starts discharging. A vent hole 20 is provided on the top of the battery lid to allow hydrogen gas to escape out of the battery.

Another important feature of the invention is that the mol number of zinc of negative plate 9 is smaller than that of lead dioxide of positive plate 8 and smaller than a half of that of sulfuric acid in order to avoid the generation of hydrogen gas. In this manner the generation of hydrogen gas is prevented as soon as discharging is finished and zinc is consumed. Because, as given in the undermentioned reaction formula, a mol ratio of lead dioxide, sulphuric acid and zinc is theoretically 1:2:1 and according to this mol ratio, zinc can be consumed more quickly than the other two components so that generation of hydrogen gas may be inhibited.

The reaction in a primary battery of lead-zinc type is expressed by the following equation.

(discharge)

$$PbO_2 + 2H_2SO_4 + Zn \rightarrow PbSO_4 + ZnSO_4 + 2H_2O$$

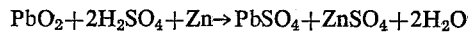

An active side reaction between sulfuric acid and zinc generates hydrogen gas and increases the temperature of the battery, resulting in a danger of explosion by a fire. However, by arranging the positive plate, negative plate, and sulfuric acid as mentioned above so that zinc is consumed when discharging is finished, a danger of explosion can be avoided since practically no hydrogen gas is generated and temperature remains unchanged.

Figure 9:
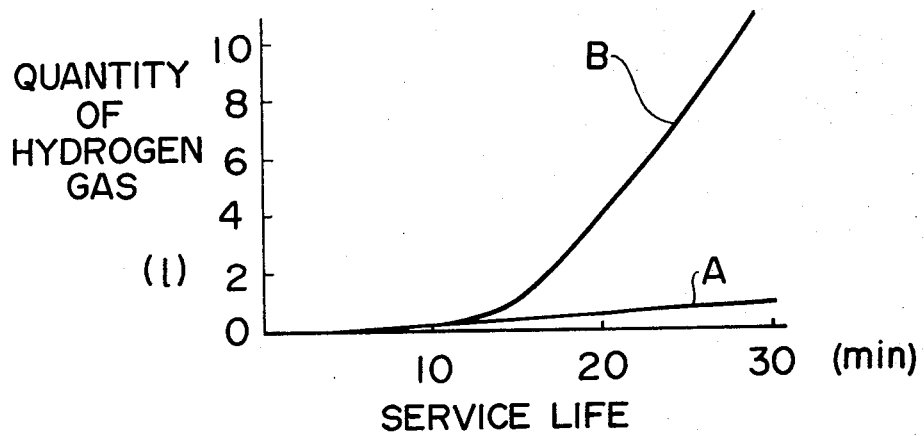
FIG. 9 is a graph showing the relation between the service life and the generation of hydrogen gas in a battery according to the invention and a conventional battery.

The graph in FIG. 9 compares battery A of the invention with conventional battery B, showing the relation between the service life and the quantity of hydrogen gas generated when zinc, lead dioxide, and sulfuric acid are arranged as mentioned above with respect to the mol number. The quantity (liter) of hydrogen gas generated is plotted on the vertical axis and the service life (minute) is plotted on the horizontal axis. It will be noted that battery A of the invention generates hydrogen gas in very small quantities.

Figure 10:
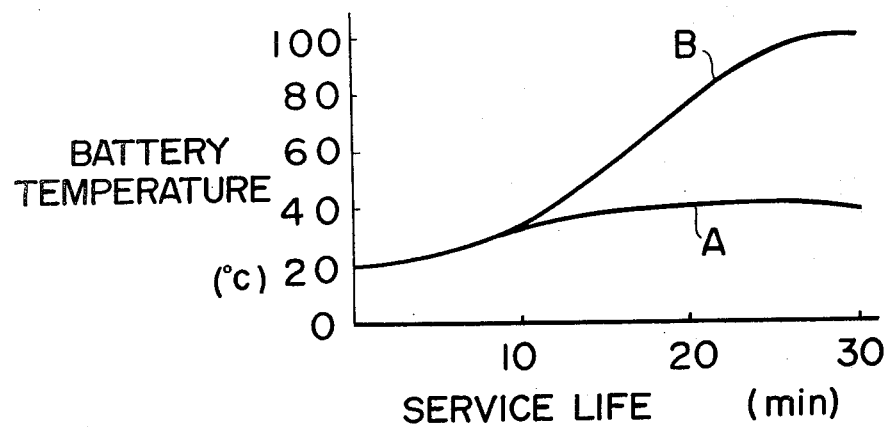
FIG. 10 is a graph showing the relation between the service life and the battery temperature in a battery according to the invention and a conventional battery.

The graph in FIG. 10 compares a battery of the invention with a conventional battery, showing the relation between the service life (minute) plotted on the horizontal axis and the battery temperature (° C.) plotted on the vertical axis, when zinc, lead dioxide, and sulfuric acid the arranged as mentioned above with respect to their mol numbers. It will be noted that the battery A of the invention is lower in temperature than the conventional one.

It will be understood that modification and variations may be effected without departing from the scope of the novel concepts of this invention and as set forth in the appended claims.

I claim:

1. A lead dioxide-zinc primary battery comprising: a battery main body having an opening on one surface thereof; a container for initially storing sulphuric acid therein and having a spout projecting from one surface thereof and a seal covering said spout; screw means interconnecting said battery main body and said container in such a manner that said opening is aligned with said spout; a plurality of cells formed within said battery main body; a lead dioxide positive plate arranged within each said cell; a zinc negative plate arranged within each said cell, said negative plate having a U-shape; a layer of heating material; a plate holder having a U-shape and providing a center groove in which said plate holder receives said positive plate, said plate holder having on both of its outer surfaces recessed portions for receiving respective ends of said negative plate; a layer of insulating material positioned between a bottom portion of said positive plate and the interior surfaces of the curved portion of said negative plate; and a push rod arranged within said container so as to be movable in an axial direction, such that when said push rod is moved it breaks said seal and allows sulphuric acid to leave said container and enter said battery main body.

2. A battery as defined in claim 1 wherein said heating material is in the form of a U-shaped plate and is arranged so as to surround the bottom and lower sides of said negative plate and said heating plate has a plurality of holes therein.

3. A battery as defined in claim 1, further comprising a terminal lead wire having one end electrically connected to a lower part of said negative plate and a cell connector wire electrically connected to said lower part of said negative plate.

4. A battery as defined in claim 1 wherein both lateral sides of said plate holder are joined by an adhesive material to the inner walls of the respective said cell.

5. A battery as defined in claim 1 wherein said container has a projected portion located at the center of its top surface and said push rod is positioned along the central axis of said container, said push rod having its top end in contact with said projected portion of said container and its lower end adjacent to said seal covering said spout of said container.

6. A battery as defined in claim 1 wherein the mol number of the zinc of said negative plate is smaller than the mol number of the lead dioxide of said positive plate and additionally said mol number of said zinc is less than half of the mol number of the sulphuric acid stored within said container.

References Cited

UNITED STATES PATENTS

| | | | |
|---|---|---|---|
| 2,624,767 | 1/1953 | Moulton | 136—113 |
| 592,722 | 10/1897 | Bell | 136—118 |
| 2,462,880 | 3/1949 | Mandel | 136—118 |
| 3,649,363 | 3/1972 | Morehouse et al. | 136—114 |
| 3,132,053 | 5/1964 | Krebs | 136—3 |
| 3,298,868 | 1/1967 | Smith et al. | 136—114 X |
| 3,536,536 | 10/1970 | Lucas | 136—114 |

ANTHONY SKAPARS, Primary Examiner

U.S. Cl. X.R.

136—118, 161